US011210400B1

(12) United States Patent
Wang et al.

(10) Patent No.: US 11,210,400 B1
(45) Date of Patent: Dec. 28, 2021

(54) COMPRESSION/DILATION TECHNIQUE FOR SYNCHRONIZING TIME-SERIES SIGNALS USED TO DETECT UNWANTED ELECTRONIC COMPONENTS IN CRITICAL ASSETS BASED ON EMI FINGERPRINTS

(71) Applicant: Oracle International Corporation, Redwood Shores, CA (US)

(72) Inventors: Guang C. Wang, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 11 days.

(21) Appl. No.: 16/915,593

(22) Filed: Jun. 29, 2020

(51) Int. Cl.
*G06F 21/00* (2013.01)
*G06F 21/56* (2013.01)
*G06F 17/14* (2006.01)
*G06F 21/55* (2013.01)

(52) U.S. Cl.
CPC .......... *G06F 21/567* (2013.01); *G06F 17/142* (2013.01); *G06F 21/552* (2013.01); *G06F 21/554* (2013.01)

(58) Field of Classification Search
CPC .... G06F 21/567; G06F 21/552; G06F 21/554; G06F 21/50; G06F 21/55; G06F 21/566; G06F 21/56; G06F 17/142
See application file for complete search history.

(56) References Cited

U.S. PATENT DOCUMENTS

| 2004/0117160 | A1* | 6/2004 | Soma | H04L 1/24 702/189 |
| 2012/0030775 | A1* | 2/2012 | Gross | G06K 9/6271 726/34 |
| 2012/0226463 | A1* | 9/2012 | Keller, III | G06F 21/73 702/117 |

* cited by examiner

*Primary Examiner* — Edward Zee
(74) *Attorney, Agent, or Firm* — Park, Vaughan, Fleming & Dowler LLP (57) ABSTRACT

The disclosed embodiments provide a system that detects unwanted electronic components in a target asset. During operation, the system obtains target electromagnetic interference (EMI) signals by monitoring EMI signals generated by the target asset while the target asset is running a periodic workload. Next, the system generates a target EMI fingerprint from the target EMI signals. The system then applies a compression/dilation technique to time-series signals in the target EMI fingerprint to achieve alignment with corresponding time-series signals in a reference EMI fingerprint to produce a synchronized target EMI fingerprint. Finally, the system compares the synchronized target EMI fingerprint against the reference EMI fingerprint to determine whether the target asset contains any unwanted electronic components.

20 Claims, 6 Drawing Sheets

COMPRESSION/DILATION TECHNIQUE FOR SYNCHRONIZING TIME-SERIES SIGNALS USED TO DETECT UNWANTED ELECTRONIC COMPONENTS IN CRITICAL ASSETS BASED ON EMI FINGERPRINTS

BACKGROUND

Field

The disclosed embodiments generally relate to techniques for detecting unwanted electronic components in critical assets. More specifically, the disclosed embodiments provide a compression/dilation technique for synchronizing time-series signals, which are used to detect unwanted components in critical assets based on electromagnetic interference (EMI) fingerprints.

Related Art

Unwanted electronic components, such as spy chips, mod chips or counterfeit components, can cause problems in critical assets, such as computing systems or utility system components. For example, bad actors will sometimes piggyback a "spy chip" onto a regular chip, or wire a "mod chip" onto a motherboard of a computing system to facilitate eavesdropping on operations of the computer system. Counterfeit components also create problems because they often perform poorly, or fail within a short period of time.

Techniques have been developed to detect such unwanted components in enterprise computing systems based on electro-magnetic interference (EMI) fingerprints, which are analyzed using prognostic-surveillance techniques. (For example, see U.S. Pat. No. 8,069,480, entitled "Detecting Counterfeit Electronic Components Using EMI Telemetric Fingerprints" by inventors Kenny C. Gross, et al., filed 16 Oct. 2007, which is incorporated by reference herein.)

The above-described technique operates by first obtaining a reference EMI fingerprint (referred to as a "golden fingerprint") from a reference system of the same type as a target system while the reference system is executing a predetermined workload, wherein the reference system is certified not to contain unwanted electronic components. Next, the technique obtains a target EMI fingerprint from the target system while the target system is executing the same workload. Next, the technique compares the target EMI fingerprint against the golden fingerprint to determine whether the target system contains any unwanted electronic components.

However, modern computer operating systems, such as Linux™ and Unix™, operate by time-slicing execution among processes. This time-slicing can speed up and slow down execution of the workload by the target system, which changes the target EMI fingerprint so that it is less effective (or useless) for detecting unwanted electronic components. This problem can be alleviated by using an expensive "lockstep" operating system to execute the workload. It is possible to use such a lockstep operating system while generating the golden fingerprint on the reference system. However, it is typically impractical to generate the target EMI fingerprint for a target system in a customer's data center.

Hence, what is needed is a technique for generating an EMI fingerprint for a target system, which compensates for the variable execution speed that arises from time-sliced execution in modern computer systems.

SUMMARY

The disclosed embodiments provide a system that detects unwanted electronic components in a target asset. During operation, the system obtains target electromagnetic interference (EMI) signals by monitoring EMI signals generated by the target asset while the target asset is running a periodic workload. Next, the system generates a target EMI fingerprint from the target EMI signals. The system then applies a compression/dilation technique to time-series signals in the target EMI fingerprint to achieve alignment with corresponding time-series signals in a reference EMI fingerprint to produce a synchronized target EMI fingerprint. Finally, the system compares the synchronized target EMI fingerprint against the reference EMI fingerprint to determine whether the target asset contains any unwanted electronic components.

In some embodiments, the compression/dilation technique operates by compressing or dilating and then analytically resampling successive segments of the time-series signals in the target EMI fingerprint based on a moving time window to achieve a substantially optimal alignment with the corresponding time-series signals in the reference EMI fingerprint.

In some embodiments, while generating the target EMI fingerprint from the target EMI signals, the system first performs a reference Fast Fourier Transform (FFT) operation on the target EMI signals to transform the target EMI signals from a time-domain representation to a frequency-domain representation. Next, the system partitions an output of the reference FFT operation into a set of frequency bins. The system then constructs a target amplitude time-series signal for each of the frequency bins, and selects a subset of frequency bins that are associated with the highest average correlation coefficients. Finally, the system generates the target EMI fingerprint by combining reference amplitude time-series signals for each of the selected subset of frequency bins.

In some embodiments, while selecting the subset of frequency bins, the system computes cross-correlations between pairs of amplitude time-series signals associated with pairs of the set of frequency bins. The system then computes an average correlation coefficient for each of the frequency bins based on the cross-correlations. Finally, the system selects a subset of frequency bins that are associated with the highest average correlation coefficients.

In some embodiments, prior to obtaining the target EMI signals, the system generates the reference EMI fingerprint. During this process, the system obtains reference EMI signals, which are generated by a reference asset of the same type as the target asset while the reference asset is running the periodic workload, wherein the reference asset is certified not to contain unwanted electronic components. The system then generates the reference EMI fingerprint from the reference EMI signals.

In some embodiments, while comparing the synchronized target EMI fingerprint against the reference EMI fingerprint, the system computes a cumulative mean absolute error (CMAE) between time-series signals in the target EMI fingerprint and time-series signals in the reference EMI fingerprint. The system then compares the CMAE against a threshold value to determine whether the target asset contains any unwanted electronic components.

In some embodiments, while comparing the synchronized target EMI fingerprint against the reference EMI fingerprint, the system first feeds the target amplitude time-series signals into an inferential model to produce estimated values for the target amplitude time-series signals, wherein the inferential model was previously trained based on time-series signals in the reference EMI fingerprint. Next, the system performs pairwise differencing operations between actual values and the estimated values for the amplitude time-series signals to produce residuals. Finally, the system analyzes the residuals to determine whether the target asset contains any unwanted electronic components.

In some embodiments, while analyzing the residuals, the system computes a CMAE based on the residuals, and then compares the CMAE against a threshold value to determine whether the target asset contains any unwanted electronic components.

In some embodiments, while analyzing the residuals, the system performs a sequential probability ratio test (SPRT) on the residuals to produce SPRT alarms. The system then determines from the SPRT alarms whether the target asset contains any unwanted electronic components.

In some embodiments, the periodic workload comprises a square-wave-shaped workload.

In some embodiments, the periodic workload a sinusoidal workload.

In some embodiments, the target asset comprises a computer system.

In some embodiments, the target asset comprises a utility system component.

DETAILED DESCRIPTION

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a new "compression/dilation technique" for synchronizing time-series signals in EMI fingerprints. This technique operates by compressing/dilating the observations in a moving time window to continuously determine an optimal phase-synchronization transform factor between time-series signals in a target EMI fingerprint against time-series signals in a reference EMI fingerprint. During this process, the technique sequentially optimizes associated lead/lag times between the time-series signals and addresses all signals in a pairwise fashion. By using moving time windows, this new technique produces a synchronized version of "varying-out-of-phase" time-series signals from the target EMI fingerprint, which is temporally aligned with corresponding time-series signals in the reference EMI fingerprint.

Before describing this technique further, we first describe details of a system in which it operates.

Unwanted-Component Detection System

Figure 1:
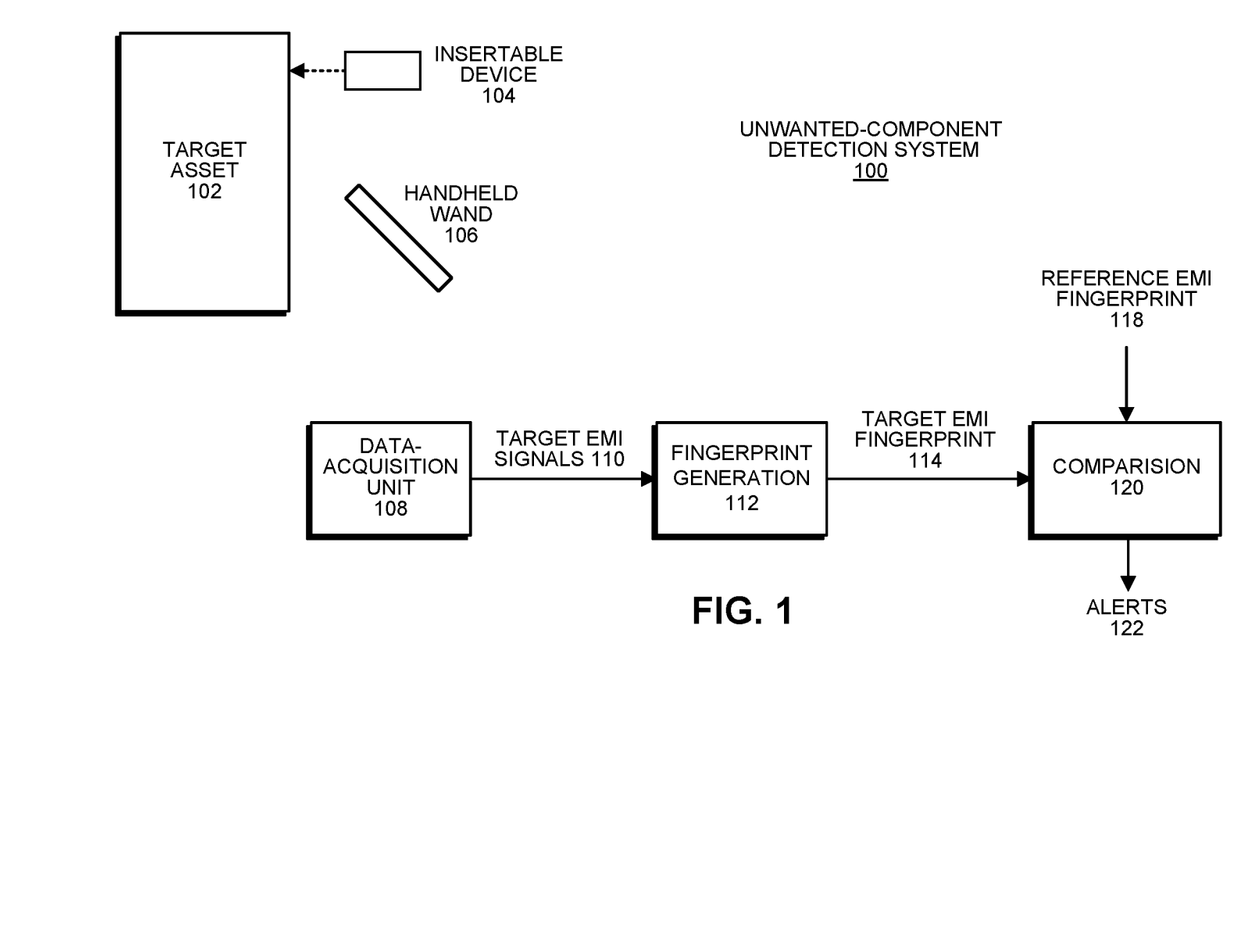
FIG. 1 illustrates an exemplary unwanted-component detection system in accordance with the disclosed embodiments.

FIG. 1 illustrates an exemplary unwanted-component detection system 100 in accordance with the disclosed embodiments. As illustrated in FIG. 1, unwanted-component detection system 100 gathers EMI signals from a target asset 102. Target asset 102 can generally include any type of critical asset, such as a component in a utility electrical distribution system, a computer server, or a machine in a factory.

The EMI-signal-gathering process can involve a number of possible EMI-signal-acquisition devices, including a handheld wand 106 and an insertable device 104. Handheld wand 106 can generally include any type of handheld device that is capable of gathering EMI emissions from target asset 102 (for example, through an antenna), and transmitting associated EMI signals to data-acquisition unit 108. Insertable device 104 can generally include any type of device that can be inserted into target asset 102 to gather EMI signals. When insertable device 104 is inserted into target asset 102, insertable device 104 is electrically coupled to a ground plane or other signal lines of target asset 102 (or, alternatively, includes a fixed antenna structure, which is optimized for a specific frequency range) to gather EMI signals from target asset 102. The gathered EMI signals are then communicated to data-acquisition unit 108.

During operation of unwanted-component detection system 100, target EMI signals 110 feed from data-acquisition unit 108 into a fingerprint-generation module 112, which generates a target EMI fingerprint 114 based on the target EMI signals 110. Target EMI fingerprint 114 can then be compared against a reference EMI fingerprint 118 by comparison module 120. (Note that reference EMI fingerprint 118 was previously generated by a reference asset of the same type as target asset 102, wherein the reference asset is certified not to contain unwanted electronic components.) If comparison module 120 determines that target asset 102 contains any unwanted electronic components, then comparison module 120 can generates alerts 122.

In some embodiments, comparison module 120 computes a CMAE between time-series signals in the target EMI fingerprint 114 and time-series signals in the reference EMI fingerprint 118. The system then compares the CMAE against a threshold value to determine whether the target asset contains any unwanted electronic components.

In other embodiments, comparison module 120 uses a multivariate state estimation (MSET) pattern-recognition model, which is trained using time-series signals from reference EMI fingerprint 118, to determine whether target asset 102 contains any unwanted electronic components. Note that the term MSET as used in this specification refers to a technique that loosely represents a class of model-based pattern recognition techniques. (For example, see [Gribok] "Use of Kernel Based Techniques for Sensor Validation in Nuclear Power Plants," by Andrei V. Gribok, J. Wesley Hines, and Robert E. Uhrig, *The Third American Nuclear Society International Topical Meeting on Nuclear Plant Instrumentation and Control and Human-Machine Interface Technologies*, Washington D.C., Nov. 13-17, 2000.) Hence, the term "MSET" as used in this specification can refer to any technique outlined in [Gribok], including Ordinary Least Squares (OLS), Support Vector Machines (SVM), Artificial Neural Networks (ANNs), MSET, or Regularized MSET (RMSET).

While determining whether target asset 102 contains any unwanted electronic components, the trained MSET model is used to predict what each time-series signal in the target EMI fingerprint should be, based on other correlated variables to produce "estimated signal values." The system then performs a pairwise-differencing operation between actual signal values and these estimated signal values to produce residuals. Next, the system uses a sequential probability ratio test (SPRT) to detect anomalies and to generate associated SPRT alarms. (For a description of SPRT, please see Wald, Abraham, June 1945, "Sequential Tests of Statistical Hypotheses." *Annals of Mathematical Statistics.* 16 (2): 117-186.) The system then determines the presence of unwanted components inside target asset 102 based on tripping frequencies of the SPRT alarms.

Detecting Unwanted Components

Figure 2:
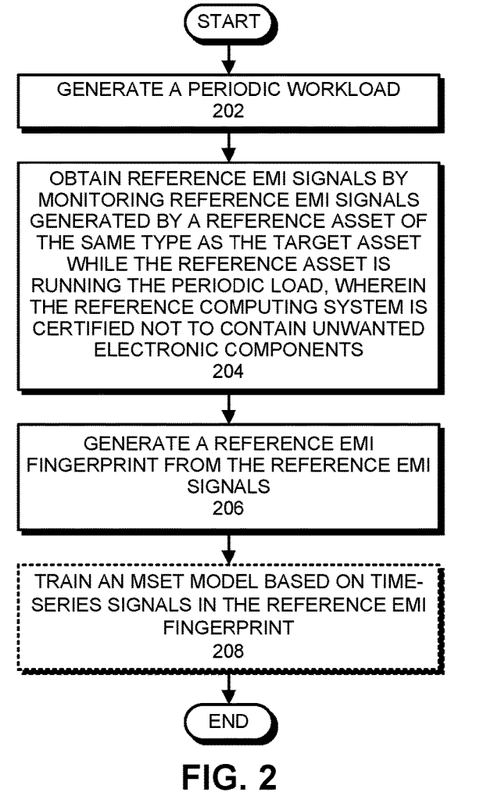
FIG. 2 presents a flow chart illustrating a process for generating a reference EMI fingerprint and training an associated inferential model in accordance with the disclosed embodiments.

FIG. 2 presents a flow chart illustrating a process for generating a reference EMI fingerprint and training an associated inferential model in accordance with the disclosed embodiments. First, the system generates a periodic workload (step 202). Next, the system obtains reference EMI signals by monitoring EMI signals generated by a reference asset of the same type as the target asset while the reference asset is running the periodic workload (step 204). The system then generates the reference EMI fingerprint from the reference EMI signals (step 206). The system also (optionally) trains an MSET model based on time-series signals in the reference EMI fingerprint (step 208).

Figure 3:
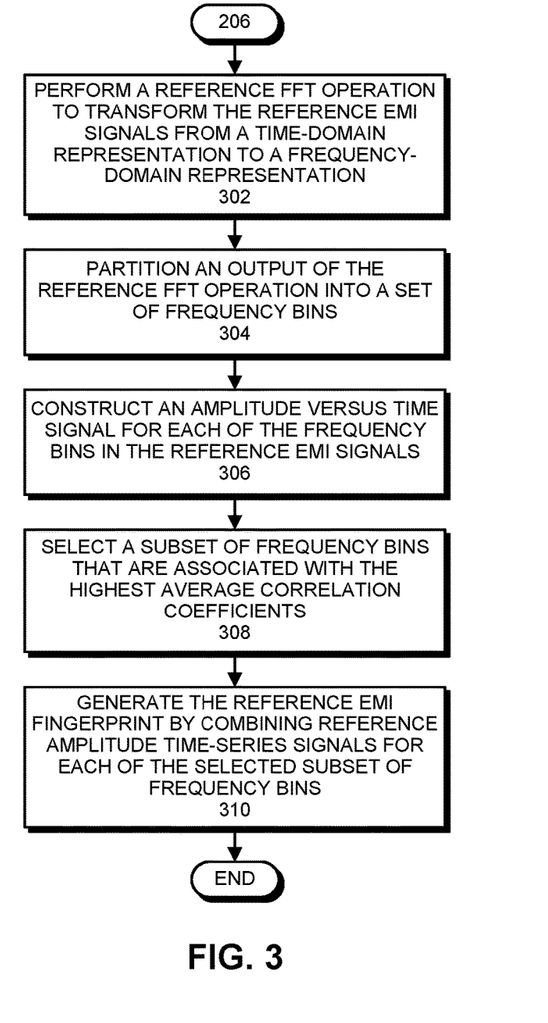
FIG. 3 presents a flow chart illustrating a process for generating the reference EMI fingerprint from reference EMI signals in accordance with the disclosed embodiments.

FIG. 3 presents a flow chart illustrating a process for generating the reference EMI fingerprint from the reference EMI signals in accordance with the disclosed embodiments. (This flow chart illustrates in more detail the operations performed in step 206 of the flow chart in FIG. 2.) The system first performs a reference FFT operation to transform the reference EMI signals from a time-domain representation to a frequency-domain representation (step 302). Next, the system partitions an output of the reference FFT operation into a set of frequency bins (step 304). The system then constructs an amplitude versus time signal (also referred to as a "reference signal") for each of the frequency bins in the reference EMI signals (step 306), and selects a subset of frequency bins that are associated with the highest average correlation coefficients (step 308). Finally, the system generates the reference EMI fingerprint by combining target amplitude time-series signals for each of the selected subset of frequency bins (step 310).

Figure 4:
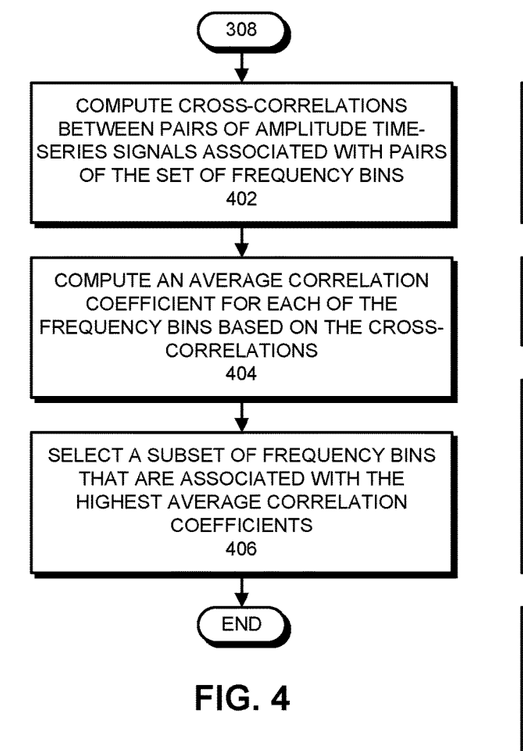
FIG. 4 presents a flow chart illustrating a process for selecting frequency bins with the highest correlation coefficients in accordance with the disclosed embodiments.

FIG. 4 presents a flow chart illustrating a process for selecting a subset of frequency bins with the highest correlation coefficients in accordance with the disclosed embodiments. (This flow chart illustrates in more detail the operations performed in step 308 of the flow chart in FIG. 3.) The system first computes cross-correlations between pairs of amplitude time-series signals associated with pairs of the set of frequency bins (step 402). Next, the system computes an average correlation coefficient for each of the frequency bins based on the cross-correlations (step 404). Finally, the system selects a subset of frequency bins that are associated with the highest average correlation coefficients (step 406).

Figure 5:
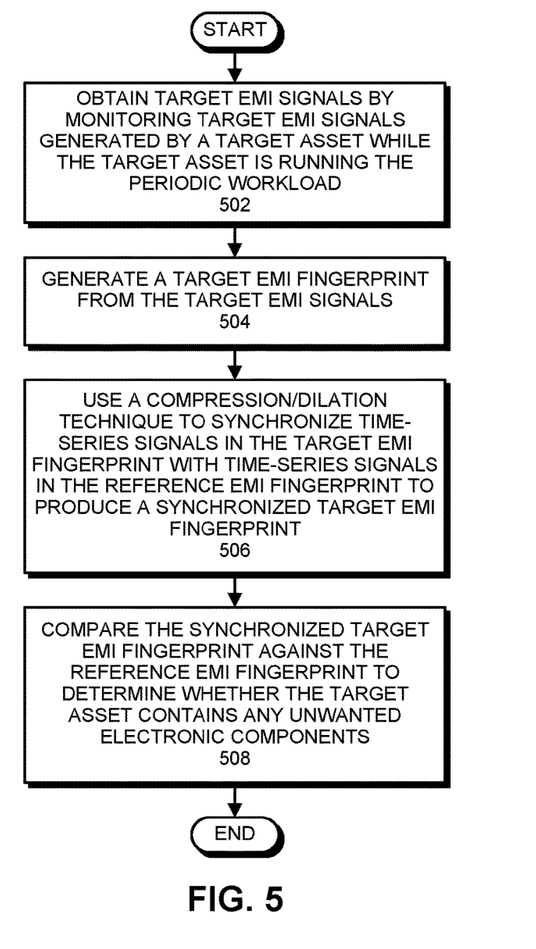
FIG. 5 presents a flow chart illustrating a process for detecting unwanted components in a target asset in accordance with the disclosed embodiments.

FIG. 5 presents a flow chart illustrating a process for detecting unwanted components in a target asset in accordance with the disclosed embodiments. First, the system obtains target EMI signals by monitoring EMI signals generated by the target asset while the target asset is running the periodic workload (step 502). Next, the system generates a target EMI fingerprint from the target EMI signals (step 504). The system then uses a compression/dilation technique to synchronize time-series signals in the target EMI fingerprint with time-series signals in the reference EMI fingerprint to produce a synchronized target EMI fingerprint (step 506). Finally, the system compares the synchronized target against the reference EMI fingerprint to determine whether the target asset contains unwanted electronic components (step 508).

Figure 6:
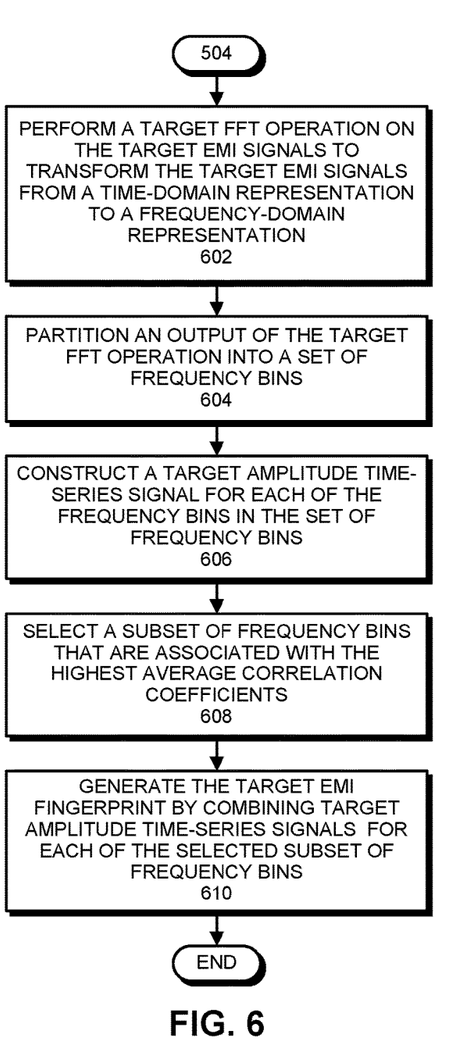
FIG. 6 presents a flow chart illustrating a process for generating a target EMI fingerprint from target EMI signals in accordance with the disclosed embodiments.

FIG. 6 presents a flow chart illustrating a process for generating a target EMI fingerprint from target EMI signals in accordance with the disclosed embodiments. (This flow chart illustrates in more detail the operations performed in step 504 of the flow chart in FIG. 5.) While generating the target EMI fingerprint from the target EMI signals, the system performs a target FFT operation on the target EMI signals to transform the target EMI signals from a time-domain representation to a frequency-domain representation (step 602). Next, the system partitions an output of the target FFT operation into a set of frequency bins (step 604). The system then constructs a target amplitude time-series signal (also referred to as a "target signal") for each of the frequency bins in the set of frequency bins (step 606), and selects a subset of frequency bins that are associated with the highest average correlation coefficients (step 608). Finally, the system generates the target EMI fingerprint by combining target amplitude time-series signals for each of the selected subset of frequency bins (step 610).

Figure 7A:
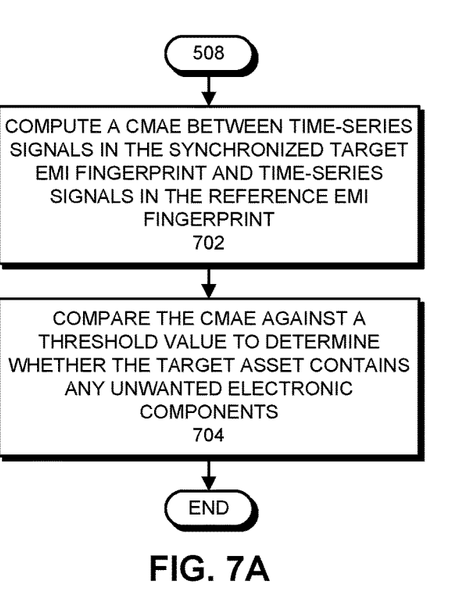
FIG. 7A presents a flow chart illustrating a process for comparing the target EMI fingerprint against the reference EMI fingerprint in accordance with the disclosed embodiments.

FIG. 7A presents a flow chart illustrating a process for comparing the target EMI fingerprint against the reference EMI fingerprint in accordance with the disclosed embodiments. (This flow chart illustrates in more detail the operations performed in step 508 of the flow chart in FIG. 5.) During this process, the system computes a CMAE between time-series signals in the synchronized target EMI fingerprint and time series signals in the reference EMI fingerprint (step 702). Next, the system compares the CMAE against a threshold value to determine whether the target asset contains any unwanted electronic components (step 704).

Figure 7B:
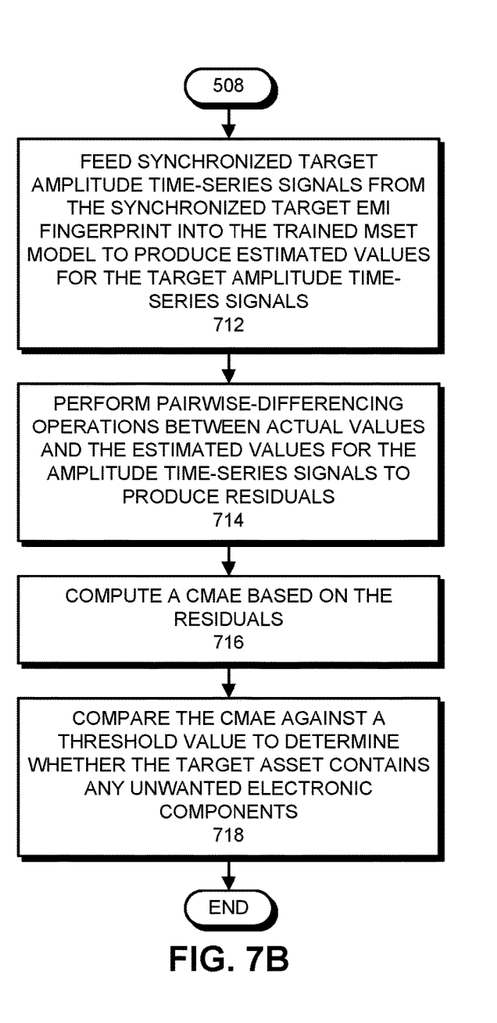
FIG. 7B presents a flow chart illustrating an alternative process for comparing the target EMI fingerprint against the reference EMI fingerprint in accordance with the disclosed embodiments.

FIG. 7B presents a flow chart illustrating an alternative process for comparing the target EMI fingerprint against the reference EMI fingerprint in accordance with the disclosed embodiments. First, the system feeds synchronized target amplitude time-series signals from the synchronized target EMI fingerprint into the trained MSET model (from step 208 above) to produce estimated values for the target amplitude time-series signals (step 712). The system then performs pairwise-differencing operations between actual values and the estimated values for the amplitude time-series signals to produce residuals (step 714). Next, the system computes a CMAE based on the residuals (step 716). Finally, the system compares the CMAE against a threshold value to determine whether the target asset contains any unwanted electronic components (step 718).

Figure 7C:
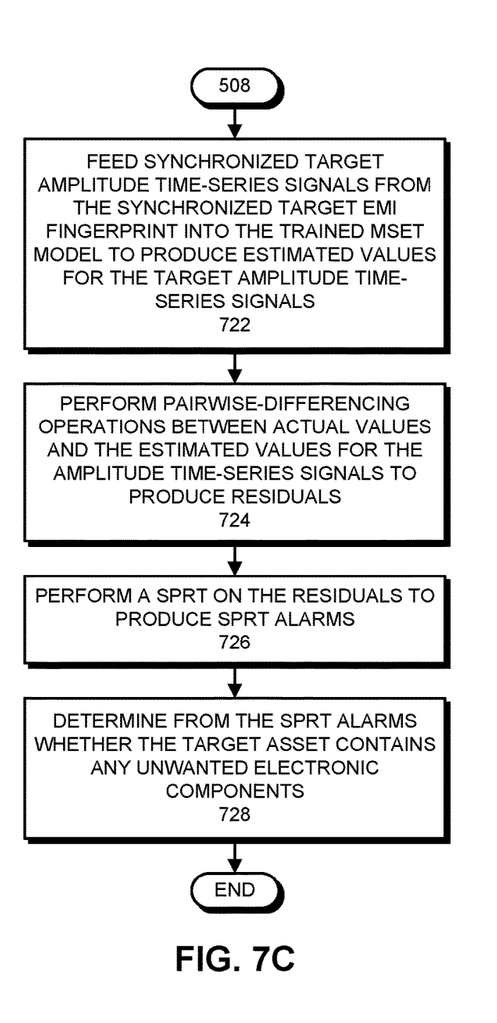
FIG. 7C presents a flow chart illustrating another alternative process for comparing the target EMI fingerprint against the reference EMI fingerprint in accordance with the disclosed embodiments.

FIG. 7C presents a flow chart illustrating another alternative process for comparing the target EMI fingerprint against the reference EMI fingerprint in accordance with the disclosed embodiments. First, the system feeds synchronized target amplitude time-series signals from the synchronized target EMI fingerprint into the trained MSET model to produce estimated values for the target amplitude time-series signals (step 722). The system then performs pairwise-differencing operations between actual values and the estimated values for the amplitude time-series signals to produce residuals (step 724). Next, the system performs a SPRT on the residuals to produce SPRT alarms (step 726). Finally, the system determines from the SPRT alarms whether the target asset contains any unwanted electronic components (step 728).

Synchronization Process

We now describe how the compression/dilation technique is used to synchronize time-series signals in the target EMI fingerprint with time-series signals in the reference EMI fingerprint. We start with a reference signal A and a corresponding varying out-of-phase signal B. The technique first uses a moving time window to segment both signals. Then, each segment of signal B is optimally compressed or expanded and is "resampled" using an analytic resampling process (ARP), wherein data points outside the present window segment are used to support the resampling process as needed. The transformed segment is then shifted by a set of pre-defined time lags using the ARP correlegram technique, which operates by at each step computing correlations to the corresponding segment of Signal A. Next, the maximum correlation is selected, and the associated lead/lag time and transform factor is determined and used to reconstitute the corresponding segment of signal B. (The ARP resampling technique and the ARP correlegram technique are both described in U.S. patent application Ser. No. 16/168,193, entitled "Automated Analytic Resampling Process for Optimally Synchronizing Time-Series Signals," by inventors Kenny C. Gross, et al., filed on 23 Oct. 2018, which is incorporated by reference herein.) Next, the time window is moved one step forward and the process is recursively repeated until the end of the time-series signals is encountered, at which point all the reconstituted segments are combined to yield the final reconstituted signal B.

Figure 8:
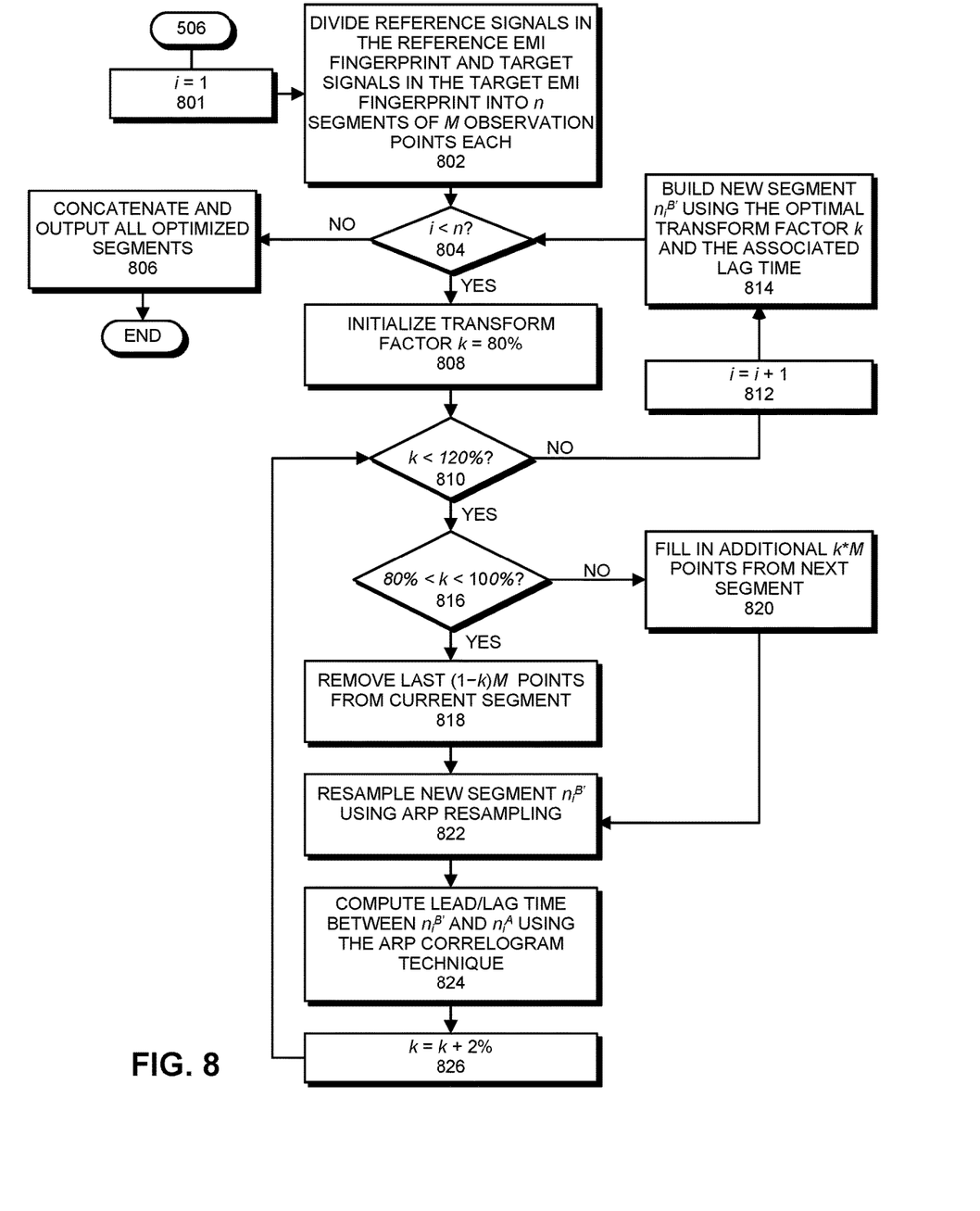
FIG. 8 presents a flow chart illustrating the compression/dilation technique for synchronizing time-series signals in the target EMI fingerprint with time-series signals in the reference EMI fingerprint in accordance with the disclosed embodiments.

Additional details of this process are presented in the flow chart that appears in FIG. 8. (This flow chart illustrates in more detail the operations performed in step 506 of the flow chart in FIG. 5.) At the start of this process, the system initializes a segment counter variable i to one (step 801), and divides reference signals in the reference EMI fingerprint and target signals in the target EMI fingerprint into n segments of M observation points each (step 802). Next, the system determines whether a segment counter variable i is less than n (step 804). If so (YES at step 804), the system initializes the transform factor k to 80% (step 808). Next, the system determines whether k is less than 120% (step 810). If so (YES at step 810), the system determines whether k is between 80% and 100% (step 816). If not (NO at step 816), the system fills in k*M additional points from the next segment of signal B (step 820) and proceeds to step 822. Otherwise, if k is between 80% and 100% (YES at step 816), the system removes (1−k)M points from the current segment of signal B (step 818) and proceeds to step 822. In step 822, the system resamples new segment $n_i^{B'}$ using the ARP resampling technique (step 822). Next, the system computes the lead/lag time between $n_i^{B'}$ and $n_i^A$ using the ARP correlegram technique (step 824).

The system then increments k by 2% (step 826) and returns to step 810. Next, if the k is not less than 120% (NO at step 810), the system increments i by 1 (step 812) and builds a new segment $n_i^{B'}$ using the optimal transform factor k and the associated lag time (step 814) and proceeds to step 804. At step 804, if the segment counter variable i is not less than n (NO at step 804), the system concatenates and outputs all optimized segments (step 806). At this point, the process is complete.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for detecting unwanted electronic components in a target asset, the method comprising:
   obtaining target electromagnetic interference (EMI) signals by monitoring EMI signals generated by the target asset while the target asset is running a periodic workload;
   generating a target EMI fingerprint from the target EMI signals;
   applying a compression/dilation technique to time-series signals in the target EMI fingerprint to achieve alignment with corresponding time-series signals in a reference EMI fingerprint to produce a synchronized target EMI fingerprint; and
   comparing the synchronized target EMI fingerprint against the reference EMI fingerprint to determine whether the target asset contains any unwanted electronic components;
   wherein the compression/dilation technique operates by compressing or dilating and then analytically resampling successive segments of the time-series signals in the target EMI fingerprint based on a moving time window to achieve a substantially optimal alignment with the corresponding time-series signals in the reference EMI fingerprint.

2. The method of claim 1, wherein generating the target EMI fingerprint from the target EMI signals involves:
   performing a reference Fast Fourier Transform (FFT) operation on the target EMI signals to transform the target EMI signals from a time-domain representation to a frequency-domain representation;
   partitioning an output of the reference FFT operation into a set of frequency bins;
   constructing a target amplitude time-series signal for each of the frequency bins in the set of frequency bins;
   selecting a subset of frequency bins that are associated with the highest average correlation coefficients; and
   generating the target EMI fingerprint by combining reference amplitude time-series signals for each of the selected subset of frequency bins.

3. The method of claim 2, wherein selecting the subset of frequency bins involves:
   computing cross-correlations between pairs of amplitude time-series signals associated with pairs of the set of frequency bins;
   computing an average correlation coefficient for each of the frequency bins based on the cross-correlations; and
   selecting a subset of frequency bins that are associated with the highest average correlation coefficients.

4. The method of claim 1, wherein prior to obtaining the target EMI signals, the method further comprises generating the reference EMI fingerprint by:
   obtaining reference EMI signals, which are generated by a reference asset of the same type as the target asset while the reference asset is running the periodic workload, wherein the reference asset is certified not to contain unwanted electronic components; and
   generating the reference EMI fingerprint from the reference EMI signals.

5. The method of claim 4, wherein comparing the synchronized target EMI fingerprint against the reference EMI fingerprint involves:
   computing a cumulative mean absolute error (CMAE) between time-series signals in the synchronized target EMI fingerprint and time-series signals in the reference EMI fingerprint; and
   comparing the CMAE against a threshold value to determine whether the target asset contains any unwanted electronic components.

6. The method of claim 4, wherein comparing the synchronized target EMI fingerprint against the reference EMI fingerprint involves:
   feeding synchronized target amplitude time-series signals into an inferential model to produce estimated values for the synchronized target amplitude time-series signals, wherein the inferential model was previously trained based on time-series signals in the reference EMI fingerprint;
   performing pairwise differencing operations between actual values and the estimated values for the synchronized target amplitude time-series signals to produce residuals; and
   analyzing the residuals to determine whether the target asset contains any unwanted electronic components.

7. The method of claim 6, wherein analyzing the residuals involves:
   computing a cumulative mean absolute error (CMAE) based on the residuals; and
   comparing the CMAE against a threshold value to determine whether the target asset contains any unwanted electronic components.

8. The method of claim 6, wherein analyzing the residuals involves:
   performing a sequential probability ratio test (SPRT) on the residuals to produce SPRT alarms; and
   determining from the SPRT alarms whether the target asset contains any unwanted electronic components.

9. The method of claim 1, wherein the periodic workload comprises one of:
   a square-wave-shaped workload; and
   a sinusoidal workload.

10. The method of claim 1, wherein the target asset comprises one of:
    a computer system; and
    a utility system component.

11. A non-transitory, computer-readable storage medium storing instructions that when executed by a computer cause the computer to perform a method for detecting unwanted electronic components in a target asset, the method comprising:
    obtaining target electromagnetic interference (EMI) signals by monitoring EMI signals generated by the target asset while the target asset is running a periodic workload;
    generating a target EMI fingerprint from the target EMI signals;
    applying a compression/dilation technique to time-series signals in the target EMI fingerprint to achieve alignment with corresponding time-series signals in a reference EMI fingerprint to produce a synchronized target EMI fingerprint; and
    comparing the synchronized target EMI fingerprint against the reference EMI fingerprint to determine whether the target asset contains any unwanted electronic components;
    wherein the compression/dilation technique operates by compressing or dilating and then analytically resampling successive segments of the time-series signals in the target EMI fingerprint based on a moving time window to achieve a substantially optimal alignment with the corresponding time-series signals in the reference EMI fingerprint.

12. The non-transitory, computer-readable storage medium of claim 11, wherein generating the target EMI fingerprint from the target EMI signals involves:
performing a reference Fast Fourier Transform (FFT) operation on the target EMI signals to transform the target EMI signals from a time-domain representation to a frequency-domain representation;
partitioning an output of the reference FFT operation into a set of frequency bins;
constructing a target amplitude time-series signal for each of the frequency bins in the set of frequency bins;
selecting a subset of frequency bins that are associated with the highest average correlation coefficients; and
generating the target EMI fingerprint by combining reference amplitude time-series signals for each of the selected subset of frequency bins.

13. The non-transitory, computer-readable storage medium of claim 11, wherein prior to obtaining the target EMI signals, the method further comprises generating the reference EMI fingerprint by:
obtaining reference EMI signals, which are generated by a reference asset of the same type as the target asset while the reference asset is running the periodic workload, wherein the reference asset is certified not to contain unwanted electronic components; and
generating the reference EMI fingerprint from the reference EMI signals.

14. The non-transitory, computer-readable storage medium of claim 13, wherein comparing the synchronized target EMI fingerprint against the reference EMI fingerprint involves:
computing a cumulative mean absolute error (CMAE) between time-series signals in the target EMI fingerprint and time-series signals in the reference EMI fingerprint; and
comparing the CMAE against a threshold value to determine whether the target asset contains any unwanted electronic components.

15. The non-transitory, computer-readable storage medium of claim 13, wherein comparing the synchronized target EMI fingerprint against the reference EMI fingerprint involves:
feeding synchronized target amplitude time-series signals into an inferential model to produce estimated values for the synchronized target amplitude time-series signals, wherein the inferential model was previously trained based on time-series signals in the reference EMI fingerprint;
performing pairwise differencing operations between actual values and the estimated values for the synchronized target amplitude time-series signals to produce residuals; and
analyzing the residuals to determine whether the target asset contains any unwanted electronic components.

16. A system that detects unwanted electronic components in a target asset, comprising:
at least one processor and at least one associated memory; and
a detection mechanism that executes on the at least one processor, wherein the detection mechanism:
obtains target electromagnetic interference (EMI) signals by monitoring EMI signals generated by the target asset while the target asset is running a periodic workload;
generates a target EMI fingerprint from the target EMI signals;
applies a compression/dilation technique to time-series signals in the target EMI fingerprint to achieve alignment with corresponding time-series signals in a reference EMI fingerprint to produce a synchronized target EMI fingerprint; and
compares the synchronized target EMI fingerprint against the reference EMI fingerprint to determine whether the target asset contains any unwanted electronic components;
wherein the compression/dilation technique operates by compressing or dilating and then analytically resampling successive segments of the time-series signals in the target EMI fingerprint based on a moving time window to achieve a substantially optimal alignment with the corresponding time-series signals in the reference EMI fingerprint.

17. The system of claim 16, wherein while generating the target EMI fingerprint from the target EMI signals, the detection mechanism:
performs a reference Fast Fourier Transform (FFT) operation on the target EMI signals to transform the target EMI signals from a time-domain representation to a frequency-domain representation;
partitions an output of the reference FFT operation into a set of frequency bins;
constructs a target amplitude time-series signal for each of the frequency bins in the set of frequency bins;
selects a subset of frequency bins that are associated with the highest average correlation coefficients; and
generates the target EMI fingerprint by combining reference amplitude time-series signals for each of the selected subset of frequency bins.

18. The system of claim 17, wherein selecting the subset of frequency bins involves:
computing cross-correlations between pairs of amplitude time-series signals associated with pairs of the set of frequency bins;
computing an average correlation coefficient for each of the frequency bins based on the cross-correlations; and
selecting a subset of frequency bins that are associated with the highest average correlation coefficients.

19. The system of claim 16, wherein prior to obtaining the target EMI signals, the detection mechanism generates the reference EMI fingerprint by:
obtaining reference EMI signals, which are generated by a reference asset of the same type as the target asset while the reference asset is running the periodic workload, wherein the reference asset is certified not to contain unwanted electronic components; and
generating the reference EMI fingerprint from the reference EMI signals.

20. The system of claim 19, wherein comparing the synchronized target EMI fingerprint against the reference EMI fingerprint involves:
computing a cumulative mean absolute error (CMAE) between time-series signals in the synchronized target EMI fingerprint and time-series signals in the reference EMI fingerprint; and
comparing the CMAE against a threshold value to determine whether the target asset contains any unwanted electronic components.

* * * * *

UNITED STATES PATENT AND TRADEMARK OFFICE
CERTIFICATE OF CORRECTION

| | |
|---|---|
| PATENT NO. | : 11,210,400 B1 |
| APPLICATION NO. | : 16/915593 |
| DATED | : December 28, 2021 |
| INVENTOR(S) | : Wang et al. |

It is certified that error appears in the above-identified patent and that said Letters Patent is hereby corrected as shown below:

In the Drawings

On sheet 1 of 6, in FIG. 1, under Reference Numeral 120, Line 1, delete "COMPARISION" and insert -- COMPARISON --, therefor.

Signed and Sealed this
Twenty-fourth Day of May, 2022

Katherine Kelly Vidal
*Director of the United States Patent and Trademark Office*